US006792811B2

(12) United States Patent
Argento et al.

(10) Patent No.: US 6,792,811 B2
(45) Date of Patent: Sep. 21, 2004

(54) METHOD AND SYSTEM FOR MEASURING VIBRATION OF AN OBJECT

(75) Inventors: Alan Argento, Chelsea, MI (US); Sridhar Lakshmanan, Belleville, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 59 days.

(21) Appl. No.: 10/091,188

(22) Filed: Mar. 4, 2002

(65) Prior Publication Data

US 2003/0164045 A1 Sep. 4, 2003

(51) Int. Cl.⁷ ................................................ G01N 9/00
(52) U.S. Cl. ....................... 73/655; 73/650; 356/486
(58) Field of Search .......................... 73/655, 579, 659, 73/660, 649, 656, 657, 661, 1.79, 1.82, 643; 356/482, 486

(56) References Cited

U.S. PATENT DOCUMENTS

| | | | |
|---|---|---|---|
| 1,591,612 A | | 9/1926 | Dickinson |
| 3,911,731 A | * | 10/1975 | Walker et al. ................. 73/660 |
| 3,952,583 A | * | 4/1976 | Rosati ......................... 73/655 |
| 4,044,377 A | | 8/1977 | Bowerman |
| 4,214,266 A | | 7/1980 | Myers |
| 4,689,993 A | | 9/1987 | Slettemoen |
| 4,893,922 A | | 1/1990 | Eichweber |
| 4,913,547 A | * | 4/1990 | Moran ......................... 356/489 |
| 4,978,222 A | | 12/1990 | Drew et al. |
| 5,020,369 A | * | 6/1991 | Washisu et al. .......... 73/514.02 |
| 5,023,845 A | * | 6/1991 | Crane et al. ................... 73/800 |
| 5,033,096 A | | 7/1991 | Morrison et al. |
| 5,099,694 A | * | 3/1992 | Sumio et al. .................. 73/654 |
| 5,173,945 A | | 12/1992 | Pieters et al. |
| 5,253,531 A | * | 10/1993 | Walker et al. ................ 73/650 |
| 5,379,106 A | | 1/1995 | Baldur et al. |
| 5,474,813 A | * | 12/1995 | Walker et al. .............. 427/510 |
| 5,521,843 A | | 5/1996 | Hashima et al. |
| 5,563,703 A | * | 10/1996 | Lebeau et al. ........... 356/237.5 |
| 5,644,442 A | | 7/1997 | Lemere |
| 5,850,254 A | | 12/1998 | Takano et al. |
| 5,901,273 A | | 5/1999 | Tsukamoto et al. |
| 6,044,183 A | | 3/2000 | Pryor |
| 6,094,269 A | * | 7/2000 | Ben-Dove et al. ........... 356/623 |
| 6,133,566 A | * | 10/2000 | Yamaguchi .................. 250/234 |
| 6,134,006 A | * | 10/2000 | Telschow et al. ........... 356/503 |

* cited by examiner

*Primary Examiner*—Hezron Williams
*Assistant Examiner*—Jacques M. Saint-Surin
(74) *Attorney, Agent, or Firm*—Brooks Kushman P.C.

(57) ABSTRACT

A method and system are provided for measurement of vibration of an object utilizing a non-contact imaging sensor such as a video camera. An object which does not already have a pair of spaced-apart marks is marked with two parallel lines spaced apart from one another a known, nominal distance. The two lines are perpendicular to an imaging axis of the camera. As such, when the object with the parallel lines is moved toward or away from the video camera, the lines on the object appear to move as two parallel lines in the image plane of the camera. As the object moves or vibrates along the imaging axis, the nominal image plane distance between the two lines changes. This apparent change in the distance between the parallel lines in the image plane is calibrated to the physical movement of the object in space due to deformation or rigid body motions.

19 Claims, 5 Drawing Sheets

METHOD AND SYSTEM FOR MEASURING VIBRATION OF AN OBJECT

STATEMENT REGARDING FEDERALLY SPONSORED RESEARCH OR DEVELOPMENT

This invention was made with government support under National Science Foundation Grant Nos. 9876942 and 9522897-REU. The government has certain rights in the invention.

BACKGROUND OF THE INVENTION

1. Field of the Invention

This invention relates to methods and systems for measuring vibration in the form of time-varying displacement of an object and, in particular, to non-contact methods and systems for measuring vibration of an object.

2. Background Art

Vibration measurements are typically made by contact devices (accelerometers, strain gages, etc.) and/or non-contact devices (laser velocometers and displacometers, fiber optic probes, eddy current probes, capacitive probes, etc.).

Although these presently available systems are effective, they suffer from a number of drawbacks that hinder their effectiveness in applications where cost-effective, high resolution, non-contact measurement from a fairly large standoff distance is required.

Among the contact type devices, accelerometers give high resolution measurement over a broad range of vibration frequencies. However, since they must be mounted to bearing housings or structural mounts or casings, source vibration signals from rotating components such as shafts and rotors are attenuated before they reach the sensor. Strain gages, on the other hand, can be attached to a rotating component and therefore directly measure its vibration. However, the measurement must be transmitted off the component by cumbersome and complicated devices such as slip rings or radio telemetry.

Non-contact measurement systems offer the ability to directly sense vibration signals of rotating components; however, some characteristics of the presently available systems limit their applications. For example, fiber optic, eddy current, and capacitive systems require extremely small standoff distance (in some cases <1 mm or 40 mils) from the target to achieve reasonable resolution. Laser velocity measuring devices that operate using the Doppler effect offer large standoff distance, high resolution, and high frequency response. However, at the present time these devices cost as much as $30,000 for a single point measurement system, and upwards of $100,000 for a whole field scanning system. Laser displacement devices utilizing geometric triangulation offer moderate resolution, reasonable standoff distance (150 mm or 6 in. maximum), but are also fairly costly, about $8,000 for a single point measurement system.

There has been some prior work in the use of video sensors for measuring relative velocity of targets, especially for measuring the relative velocity between two vehicles, or between a host vehicle and the ground, both of which are common in the transportation/automotive applications. However, these systems are not appropriate for laboratory or field testing of typical engineering components, as their resolution is not adequate for measuring small vibrations.

U.S. Pat. No. 4,893,922 to Eichweber, U.S. Pat. No. 5,033,096 to Morrison, et al., U.S. Pat. No. 5,173,945 to Pieters, et al., U.S. Pat. No. 5,379,106 to Baldur, U.S. Pat. No. 5,521,843 to Hashima, et al., U.S. Pat. No. 5,901,273 to Tsukamoto, et al. and U.S. Pat. No. 6,044,183 to Pryor disclose various position monitoring systems utilizing markings on a target object to calibrate the position of the object. The spaced markings have a known displacement and are monitored to determine the position of the target to which they are attached.

U.S. Pat. No. 4,044,377 to Bowerman discloses a system for the non-contact measurement of the longitudinal and lateral displacement of a target. The system is particularly adapted for permitting a robot to focus on a target for optimal operation of an automated system.

U.S. Pat. No. 1,591,612 to Dickinson and U.S. Pat. No. 4,689,993 to Slettemoen are exemplary of systems in which the vibrational movement of an object is monitored.

U.S. Pat. Nos. 4,978,222; 5,253,531 and 5,850,254 generally disclose the detection of vibration using video techniques.

U.S. Pat. Nos. 4,214,266 and 5,644,442 are of a more general interest.

SUMMARY OF THE INVENTION

An object of the present invention is to provide a method and system for measuring vibration of an object in a cost-effective, high resolution manner from a relatively large standoff distance.

Another object of the present invention is to provide a method and system for measuring vibration of an object by simultaneously imaging many points on the same object. This feature means that modal analysis (measurement of all natural frequencies and mode shapes) of a vibrating object can be achieved using a single test (called a SIMO test, for single input—multiple output).

In carrying out the above objects and other objects of the present invention, a method for measuring vibration of an object, having a pair of substantially coplanar, spaced-apart marks is provided. The method includes providing calibration data based on a correlation of a change in distance between the spaced-apart marks in a detector plane substantially parallel to the spaced-apart marks to physical movement of the object including the spaced-apart marks. The method further includes generating a plurality of images including the spaced-apart marks from signals reflected from the object in the detector plane. The method further includes measuring energy in the images in the detector plane to produce a plurality of signals, and processing the plurality of signals with the calibration data to obtain a vibration measurement of the object.

The spaced-apart marks may be parallel lines which are part of the object.

The method may further include the step of marking the object with the spaced-apart marks which may be substantially coplanar parallel lines.

The signals reflected from the object may be light signals wherein the energy in the images in the detector plane is radiant energy.

Further in carrying out the above objects and other objects of the present invention, a system for measuring vibration of an object having a pair of substantially coplanar, spaced-apart marks is provided. The system includes means for generating an image including the spaced-apart marks in a detector plane substantially parallel to the spaced-apart marks. The system also includes means for storing calibration data based on a correlation of a change in distance between the spaced-apart marks in the detector plane to physical movement of the object including the spaced-apart marks. The system further includes means for generating a plurality of images including the spaced-apart marks from signals reflected from the object in the detector plane substantially parallel to the spaced-apart marks. At least one detector is provided for measuring energy in the images in the detector plane to produce a plurality of signals, and a signal processor is provided for processing the plurality of signals with the calibration data to obtain a vibration measurement of the object.

A marker may be provided for marking the object with the spaced-apart marks such as a pair of substantially coplanar parallel lines. The substantially coplanar parallel lines may be part of the object.

The signals reflected from the object may be light signals and the at least one detector may be an array of photodetectors. The plurality of photodetectors may include a video camera.

The spaced-apart marks may be parts of a single curved line such as a sine or cosine curve or may be parts of separate lines.

The system of the present invention is a non-contact vibration measurement system with a large standoff distance and is relatively inexpensive. Such a system finds a wide range of applications in the industrial and military communities in test facilities, machinery equipment rooms, power plants, and manufacturing centers. The system is especially well suited for vibration measurement of rotating machinery components including rotors, power transmission shafts, motors, gears, flywheels, disks, and tool spindles. This market consists of the military, automotive, power, manufacturing, and aerospace industries. At the present time, comparable sensors (Laser Doppler) are very costly.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

In general, the method and system of the present invention are based on non-contact vibration imaging. The system is capable of sensing vibration displacement from a large standoff distance and to perform measurements at high frequency and high resolution. The system is low-cost can be made of an affordable off-the-shelf camera and electronics. The system can be integrated into one module that contains all of its sub-components and is very small in size and very cheap in price. As a result, the system may be portable.

Figure 1:
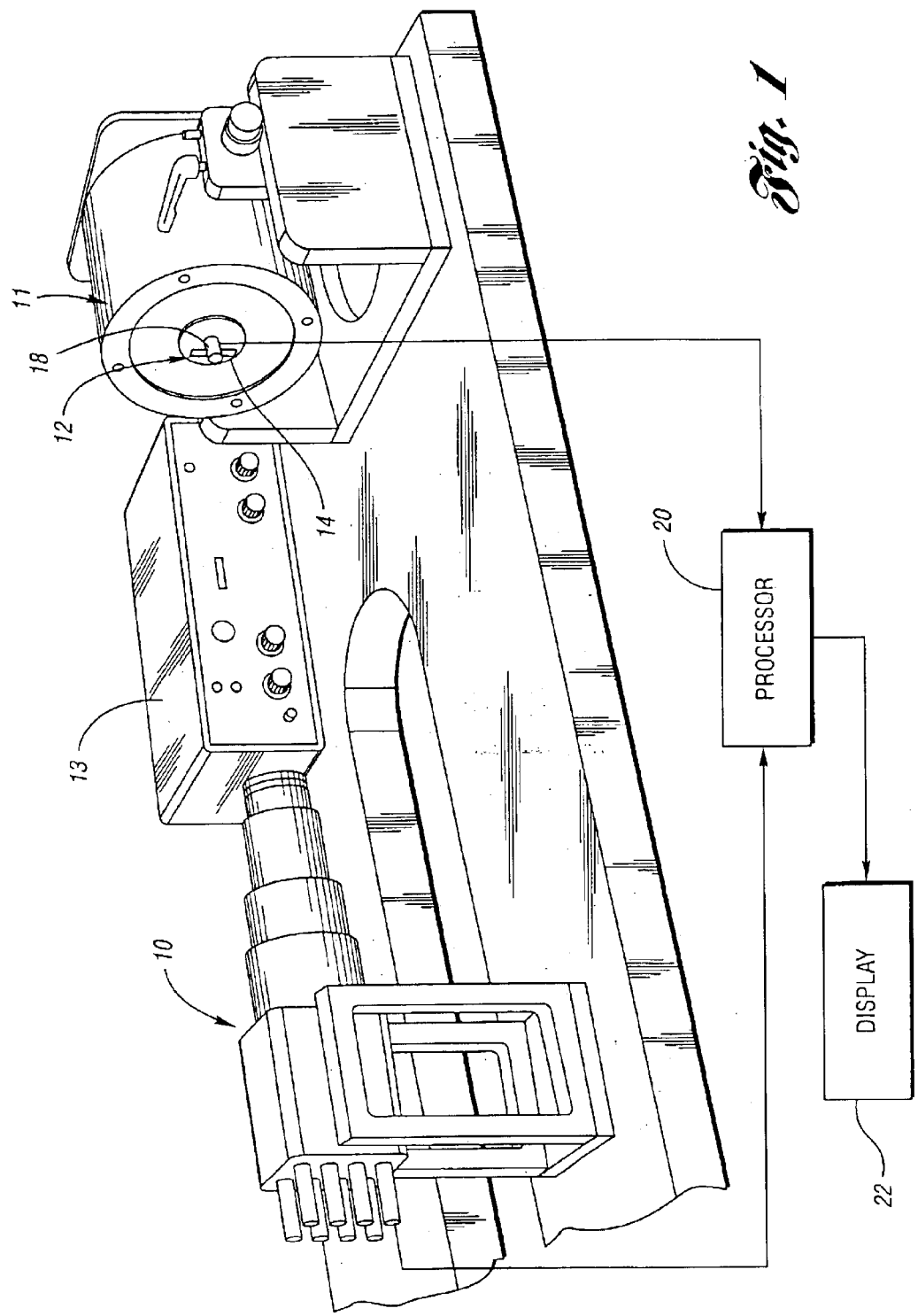
FIG. 1 is a schematic view of both a contact system and a non-contact system for measuring vibration in accordance with a method of the present invention.

The system preferably includes an imaging sensor such as a video camera 10 as a vibration sensor, as illustrated in FIG. 1, which demonstrates the measurement method. The camera 10 receives signals representative of the image of an object such as vibrating stage 12 of a mechanical shaker 11 as illustrated in FIG. 1, whose vibration is to be measured, coupled to a computer system or other signal processing device or processor 20 to interpret the signals received for image content. The processor 20 is coupled to a display 22.

If not naturally so marked, the object or target 12 (target denotes the vibrating component) is marked with spaced-apart marks such as two lines that are parallel to each other and perpendicular to the image axis. However, it is to be understood that the spaced-apart marks may be parts of a single line. Also, the spaced-apart marks may be replaced by a sine or cosine curve.

Standardized adhesive markers 14 containing parallel lines separated by a nominal distance may be used. A user only needs to attach the marker 14 to the target 12. When this target 12 is imaged using the video camera 10, the lines on the target 12 appear as two parallel lines in the image plane set apart by a nominal distance. As the target 12 moves (i.e. vibrates) along the image axis, the nominal image plane distance between the two lines changes. As the target 12 moves away from the video camera 10 along the image axis, the distance between lines becomes smaller and vice-versa if the target 12 moves closer to the video camera 10. This apparent change in the distance between the parallel lines in the image plane is calibrated to the physical movement of the target 12 in space due to deformation or rigid body motions to obtain calibration data which is processed together with the signals generated by the video camera 10 to obtain a vibration measurement. Such calibration typically includes using the same video camera 10. However, a different video camera or other imaging sensor could be used.

Figure 2A:
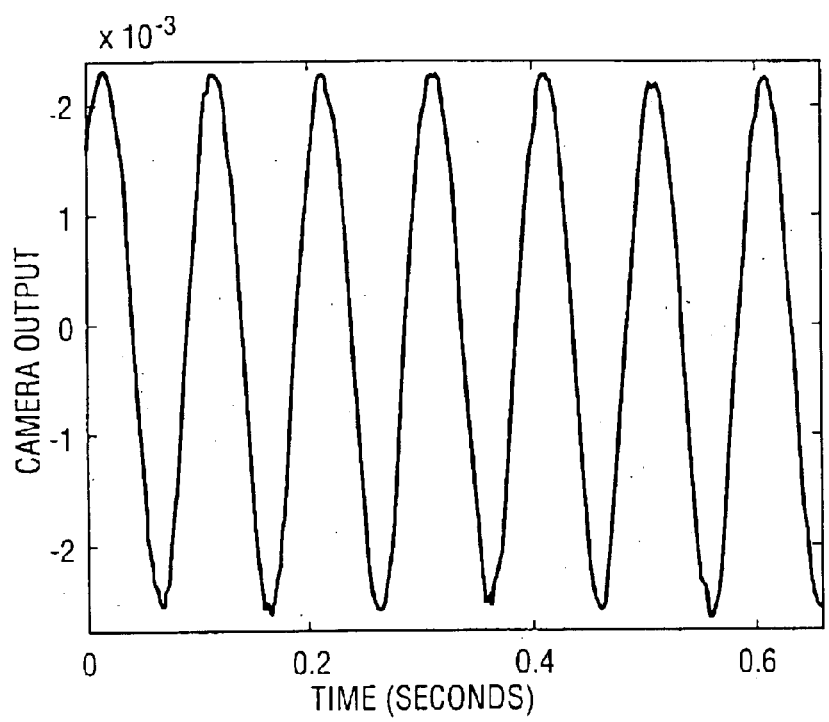
FIGS. 2a and 3a are graphs showing vibration time histories of the motion of an objected from camera images and the output of an accelerometer, is vibrating at 10 Hz.
Figure 2B:
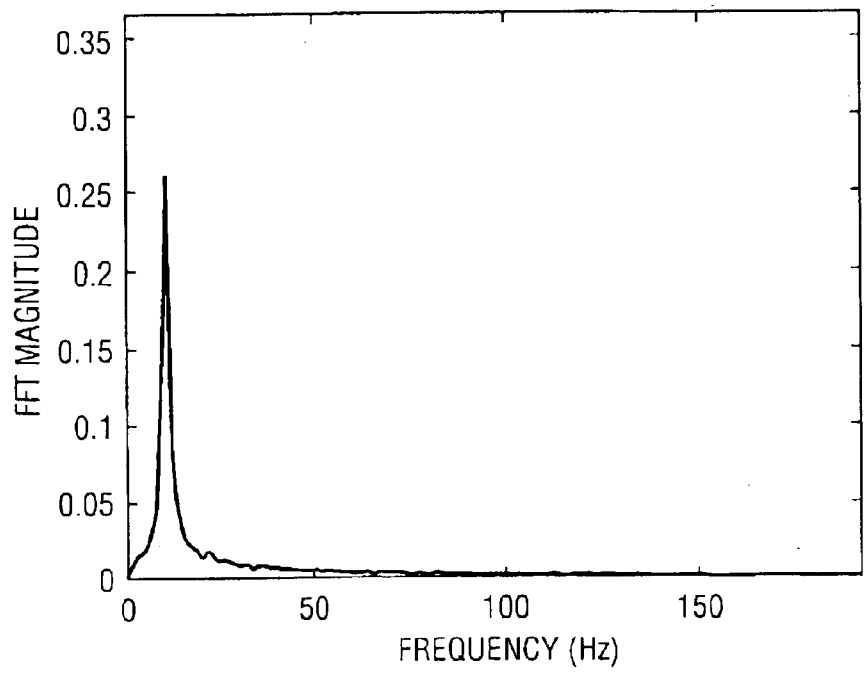
FIGS. 2b, 3b, 4b and 5b are graphs of Fast Fourier Transforms of the time histories in FIGS. 2a, 3a, 4a and 5a, respectively.
Figure 3A:
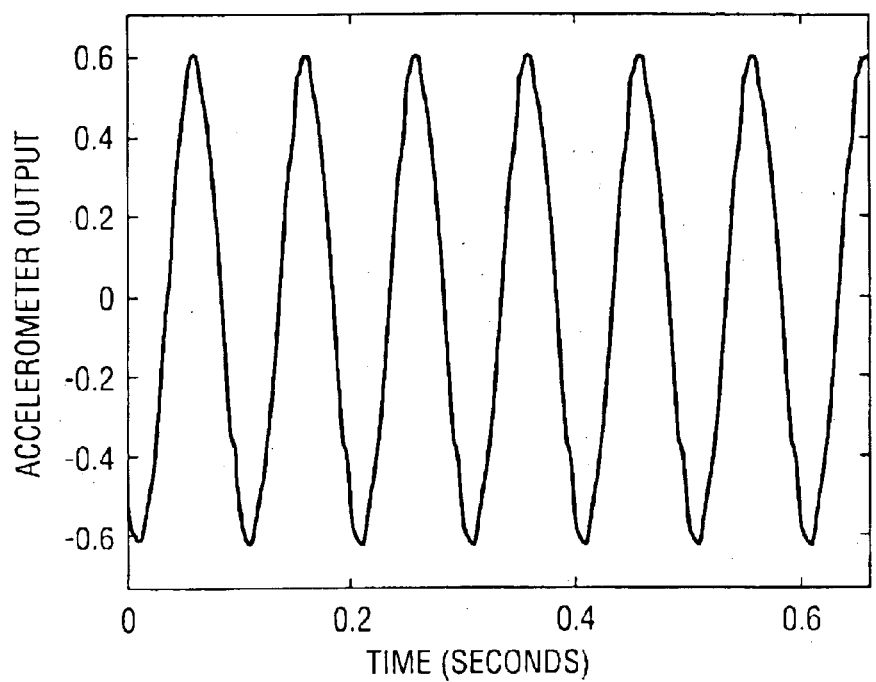
Figure 3B:
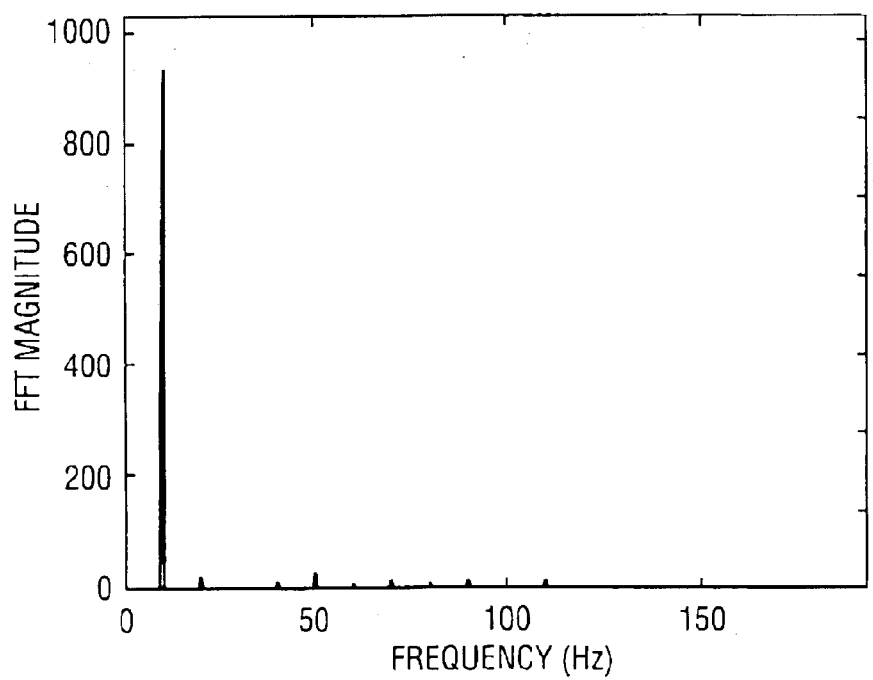

The vibration imaging system of the present invention was tested on the vibration set-up in FIG. 1, which consists of the mechanical shaker 11 and a controllable power amplifier and signal generator 13. During the tests, an accelerometer 18 and the system of the present invention were simultaneously used to measure the same vibration. In the tests, the shaker 11 was driven using 10 Hz and 80 Hz harmonic excitation. FIGS. 2–5 show the results of these simultaneous measurements. FIGS. 2a and 3a show the 10 Hz time history of the motion of the target 12 constructed from the camera images and the output by the accelerometer 18, respectively. FIGS. 2b and 3b give the FFTs of these time histories, and reveal the target's natural frequency. The similarity between both these measurements, in the time-domain as well as in the frequency domain is notable. The two measurements, however, are not in the same amplitude scale, because the vibration imaging system was not calibrated.

Figure 4A:
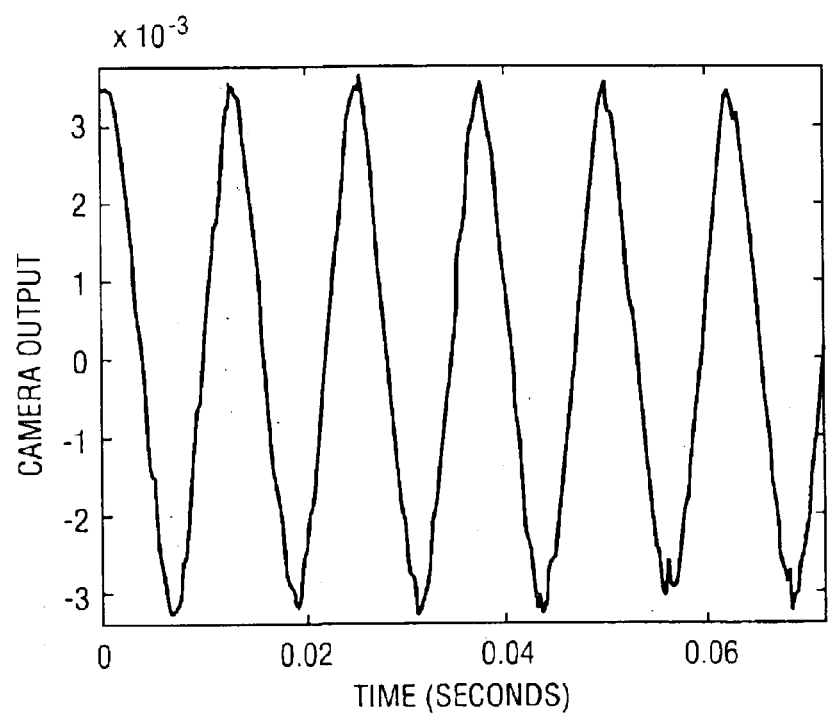
FIGS. 4a and 5a are graphs similar to the graphs of FIGS. 2a and 3a, respectively, but with the target vibrating at 80 Hz.
Figure 4B:
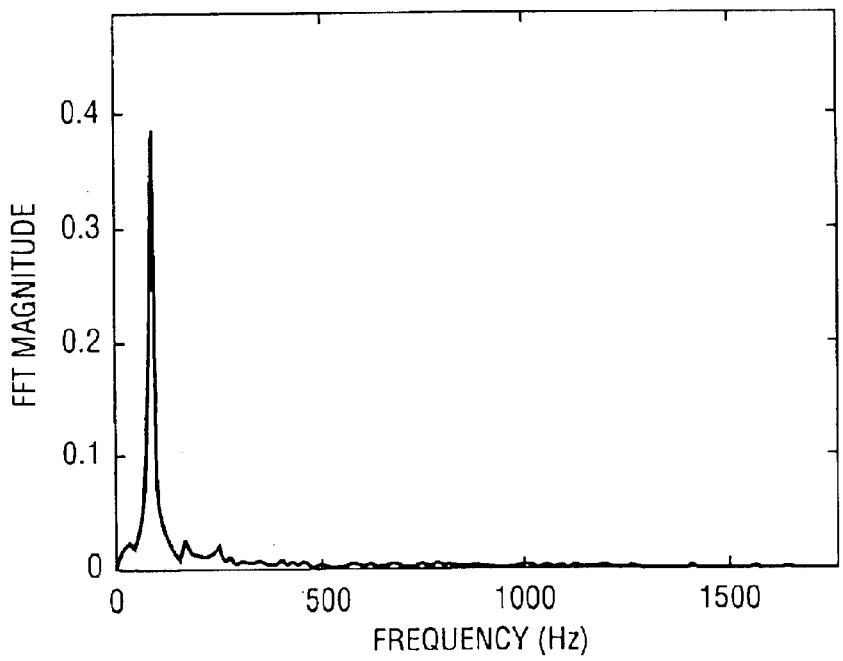
Figure 5A:
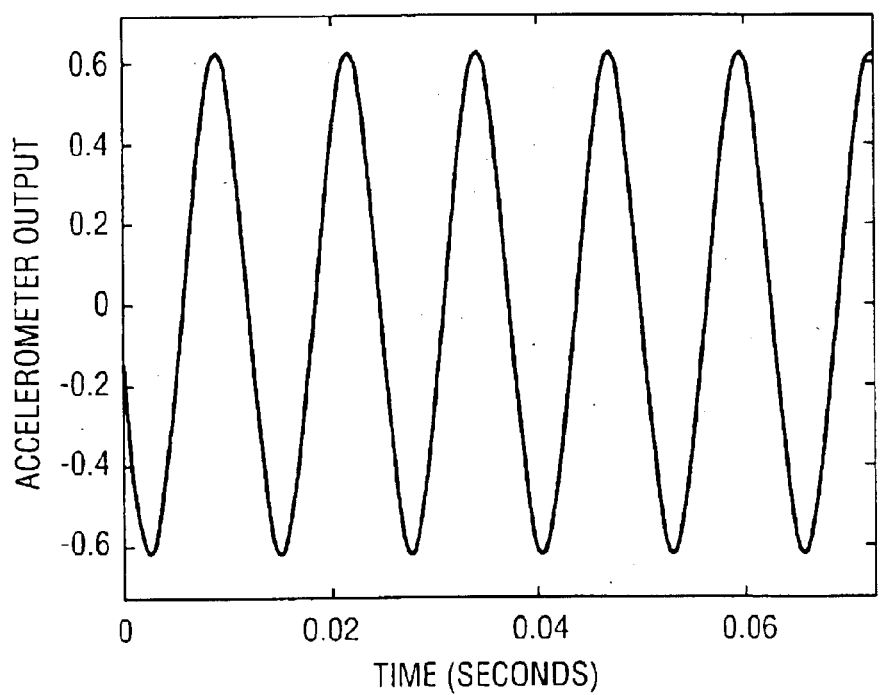
Figure 5B:
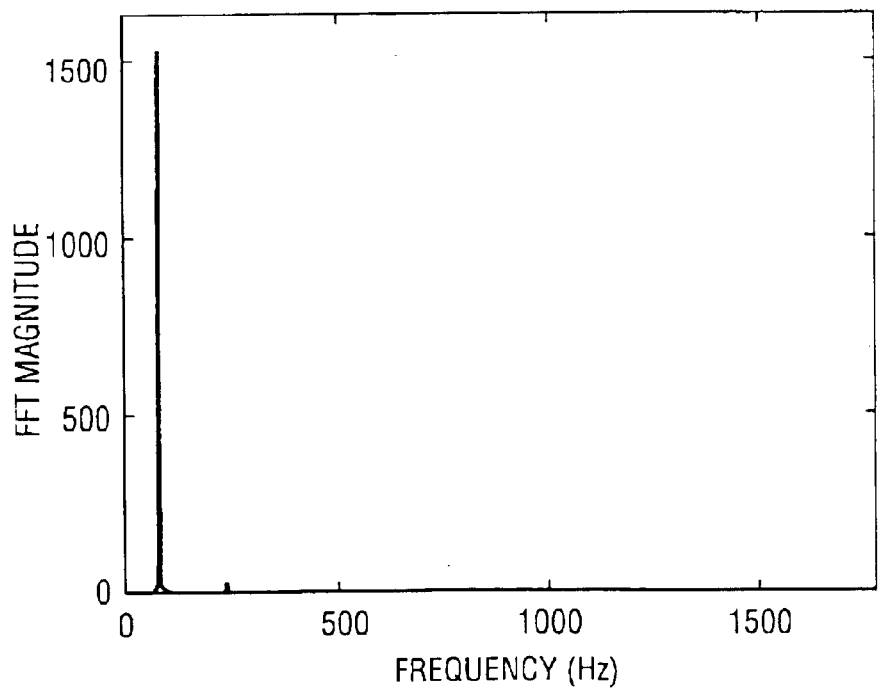

Analogous results for the 80 Hz driving excitation case are shown in FIG. 4 (present invention) and FIG. 5 (accelerometer). Similarities between both these measurements in the time-domain as well as in the frequency domain (i.e. FIGS. 4b and 5b) is again notable.

While the best mode for carrying out the invention has been described in detail, those familiar with the art to which this invention relates will recognize various alternative designs and embodiments for practicing the invention as defined by the following claims.

What is claimed is:

1. A method for measuring vibration of an object having a pair of substantially coplanar, spaced-apart marks, the method comprising:

providing calibration data based on a correlation of a change in distance between the spaced-apart marks in a detector plane substantially parallel to the spaced-apart marks to physical movement of the object including the spaced-apart marks;

generating a plurality of images including the spaced-apart marks from signals reflected from the object in the detector plane;

measuring energy in the images in the detector plane to produce a plurality of signals; and processing the plurality of signals with the calibration data to obtain a vibration measurement of the object.

2. The method of claim 1, wherein the spaced-apart marks are part of the object.

3. The method of claim 1, further comprising the step of marking the object with the spaced-apart marks.

4. The method of claim 1, wherein the signals reflected from the object are light signals and wherein the energy in the images in the detector plane is radiant energy.

5. The method of claim 1, wherein the spaced-apart marks are parallel lines.

6. The method of claim 1, wherein the spaced-apart marks are parts of a single line.

7. The method of claim 6, wherein the single line is a curved line.

8. The method of claim 7, wherein the curved line is a sine or cosine curve.

9. The method of claim 1, wherein the spaced-apart marks are parts of separate lines.

10. A system for measuring vibration of an object having a pair of substantially coplanar, spaced-apart marks, the system comprising:

means for generating an image including the spaced-apart marks in a detector plane substantially parallel to the spaced-apart marks;

means for storing calibration data based on a correlation of a change in distance between the spaced-apart marks in the detector plane to physical movement of the object including the spaced-apart marks;

means for generating a plurality of images including the spaced-apart marks from signals reflected from the object in the detector plane substantially parallel to the spaced-apart marks;

at least one detector for measuring energy in the images in the detector plane to produce a plurality of signals; and a signal processor for processing the plurality of signals with the calibration data to obtain a vibration measurement of the object.

11. The system as claimed in claim 10, further comprising a marker for marking the object with the pair of substantially coplanar, spaced-apart marks.

12. The system as claimed in claim 10, wherein the substantially coplanar, spaced-apart marks are part of the object.

13. The system as claimed in claim 10, wherein the signals reflected from the object are light signals and wherein the at least one detector comprises an array of photodetectors.

14. The system as claimed in claim 13, wherein the array of photodetectors include a video camera.

15. The system as claimed in claim 10, wherein the spaced-apart marks are parallel lines.

16. The system as claimed in claim 10, wherein the spaced-apart marks are parts of a single line.

17. The system as claimed in claim 16, wherein the single line is a curved line.

18. The system as claimed in claim 10, wherein the spaced-apart marks are parts of separate lines.

19. The system as claimed in claim 17, wherein the curved line is a sine or cosine curve.

* * * * *